United States Patent [19]

Wilkinson et al.

[11] Patent Number: 4,638,380

[45] Date of Patent: Jan. 20, 1987

[54] DIGITAL VIDEO TAPE RECORDER APPARATUS

[75] Inventors: James H. Wilkinson; Clive H. Gillard, both of Basingstoke, United Kingdom

[73] Assignee: Sony Corporation, Tokyo, Japan

[21] Appl. No.: 608,516

[22] Filed: May 9, 1984

[30] Foreign Application Priority Data

May 19, 1983 [GB] United Kingdom ............... 8313821

[51] Int. Cl.$^4$ .......................... G11B 5/02; H04N 5/78
[52] U.S. Cl. ...................................... 360/22; 360/38.1
[58] Field of Search ........................ 360/32, 22, 53, 48, 360/38.1, 33.1

[56] References Cited

U.S. PATENT DOCUMENTS

| | | | |
|---|---|---|---|
| 4,393,414 | 7/1983 | Reitmeier | 360/38.1 |
| 4,398,224 | 8/1983 | Watanabe | 360/38.1 |
| 4,470,065 | 9/1984 | Reitmeier | 360/38.1 |
| 4,539,605 | 9/1985 | Hoshino et al. | 360/32 |

Primary Examiner—Vincent P. Canney
Attorney, Agent, or Firm—Lewis H. Eslinger; Alvin Sinderbrand

[57] ABSTRACT

Digital video tape recorder apparatus comprises a recording head assembly having 2n heads, where n is an integer, preferably one, two or three, a demultiplexer for demultiplexing the video samples of an incoming digital television signal sample-by-sample, into 2n channels for supply to the 2n recording heads, and a switching arrangement for switching the connections between the channels and the heads line-by-line and also possibly field-by-field or frame-by-frame of the television signal.

9 Claims, 10 Drawing Figures

DIGITAL VIDEO TAPE RECORDER APPARATUS

BACKGROUND OF THE INVENTION

1. Field of the Invention

This invention relates to digital video tape recorder apparatus.

2. Description of the Prior Art

To record a television signal using a digital video tape recorder (VTR), an incoming analog television signal is sampled, for example to produce luminance and color difference video samples, these video samples are pulse code modulation coded to produce corresponding binary video samples, and signals representing these binary samples are recorded. On reproduction, the binary samples are usually subjected to error correction and error concealment processes before being decoded to form a replica of the original analog television signal.

If the signals are recorded using a digital VTR having a single recording head, then very high data rates are involved, for example 200 to 400 Megabits/second. Such high data rates cause problems, such as ferrite loss in the recording and reproducing heads, and they also necessitate the use of wide bandwidth amplifiers. It is therefore known to demultiplex the data prior to recording, and to use multiple-head assemblies for recording and reproduction. Thus the data may be demodulated into two or four channels, and the recording and reproducing head assemblies each then comprise two or four heads respectively, so that on recording and reproduction, two or four tracks are recorded on or read from the tape at each pass of the head assembly. The demultiplexed data for recording is supplied to the respective heads in the recording head assembly in some fixed predetermined way.

This will now be described in more detail with reference to FIGS. 1 and 2 of the accompanying drawings.

FIG. 1 shows in the top line a sequence of video samples comprising alternating luminance and color difference video samples, the color difference samples also alternating between $C_B$ and $C_R$. The figure also indicates a known method of demultiplexing the video samples into two channels for supply to respective recording heads A and B. As shown, the demultiplexing is such that the head A, for example, receives alternating luminance samples and alternating pairs of color difference samples. Alternative methods of demultiplexing are of course possible, and in particular the color difference samples can be differently distributed between the heads A and B. However, for simplicity, attention will now be confined to the luminance samples, although similar considerations apply to the color difference samples.

FIG. 2 shows a spatial array of reproduced luminance samples, each line of crosses in the array representing respective luminance samples along a horizontal scan line of the television picture. Suppose now that one of the two heads in the recording or the reproducing head assembly has failed, for example by becoming clogged, so that no reproduced luminance samples are derived from the corresponding channel. In consequence the ringed samples will be lost from the array. To replace these lost samples using a concealment process, the main possibilities are interpolation in the horizontal direction 3 or interpolation in the positive and/or negative diagonal directions 4 and 5. Despite such concealment, it is difficult to produce a television picture which is significantly better than that which would have been produced if the initial sampling rate had been halved.

SUMMARY OF THE INVENTION

One object of the present invention is to provide digital video tape recorder apparatus in which this difficulty is reduced.

Another object of the present invention is to provide digital video tape recorder apparatus in which if all the samples reproduced by one head are lost, the reproduced samples which are available provide reasonable opportunities for concealment by interpolation of the lost samples.

Another object of the present invention is to provide digital video tape recorder apparatus in which a multiplexer switches supply of samples between two recording heads line-by-line of the television signal.

According to the present invention there is provided a digital video tape recorder comprising:

a recording head assembly having 2n heads, where n is an integer;

a demultiplexer for demultiplexing the video samples forming an incoming digital video signal sample by sample into 2n channels for supply to said 2n recording heads; and switching means for switching the connections between said channels and said heads line-by-line of said television signal.

Preferably n is one, two or three. It is also preferable that the switching means operates to switch the connections between said channels and said heads on a frame-by-frame basis, although in some circumstances this effect will be achieved without the need for any additional switching. For example, if n is two and the television signal is of a system having an odd number of lines per frame, such as the 625-line systems used in Europe or the 525-line system used in the U.S.A., then the line-by-line switching will automatically effect frame-by-frame switching.

The above, and other objects, features and advantages of this invention will be apparent from the following detailed description of illustrative embodiments which is to be read in connection with the accompanying drawings.

BRIEF DESCRIPTION OF THE DRAWINGS

FIG. 7 shows diagrammatically yet another spatial array of reproduced luminance samples;

FIG. 8 shows another temporal array of reproduced luminance samples; and

FIG. 9 shows yet another temporal array of reproduced luminance samples.

DESCRIPTION OF THE PREFERRED EMBODIMENTS

Figure 1:
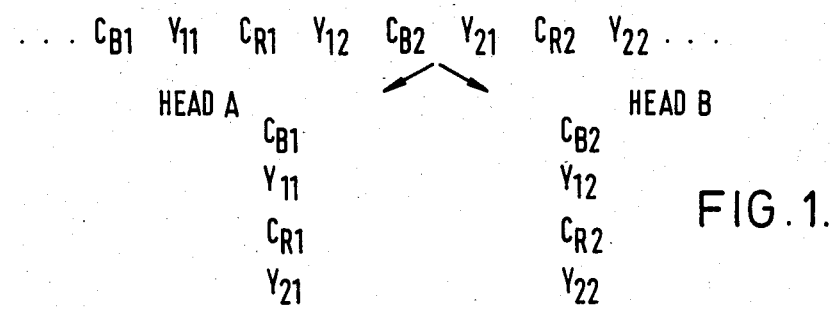
FIG. 1 shows diagrammatically the demultiplexing of a sequence of video samples.
Figure 3:
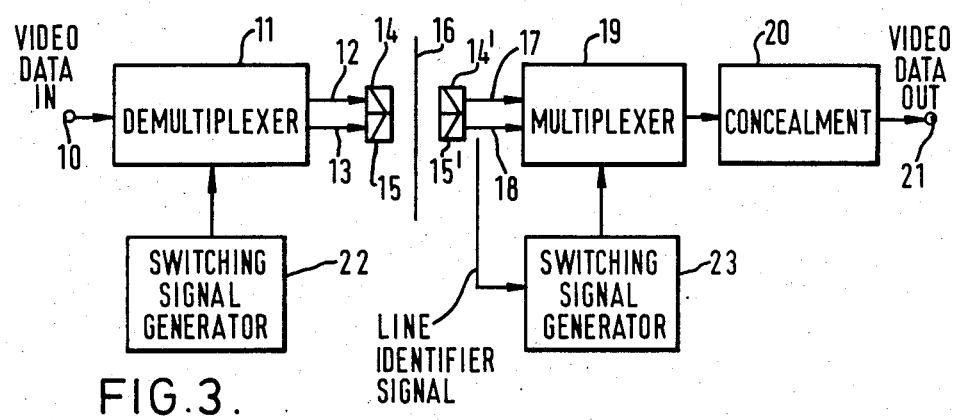
FIG. 3 shows in block diagrammatic form part of an embodiment of video tape recorder apparatus according to the invention.

Referring to FIG. 3, in a video tape recorder according to the invention, video data in the form of a sequence of video samples corresponding to an input television signal are supplied by way of an input 10 to a demultiplexer 11. The demultiplexer 11 demultiplexes the video samples into two channels 12 and 13, for example as described above with reference to FIG. 1. Alternatively the demultiplexer 11 may demultiplex the video samples into some other even number of channels, such as four or six. The channels 12 and 13 are respectively connected to recording heads 14 and 15 in a single head assembly, for recording in respective tracks on a magnetic tape 16. The recording heads 14 and 15 may be mounted adjacent to one another as shown or may be mounted diametrically opposite one another on the head assembly. Subsequently, the recorded tracks are respectively reproduced by reproducing heads 14' and 15', which may in fact be the recording heads 14 and 15, and the reproduced video samples are supplied to channels 17 and 18 which are connected to a multiplexer 19. The multiplexer 19 performs the inverse operation to that of the demultiplexer 11, and the re-multiplexed video samples are supplied, after some error correction process if required, to a concealment device 20 where any remaining error samples (including lost samples) are if possible replaced by some interpolation process before the output video data are supplied to an output 21.

Connected to the demultiplexer 11 and the multiplexer 19 respectively are switching signal generators 22 and 23 which each operate on a line-by-line basis to alternate the demultiplexing and multiplexing processes. That is to say, in a first horizontal scan line video samples which occupy given positions are supplied over the channel 12 to the head 14 and in the next subsequent horizontal scan line the video samples occupying positions corresponding to those given positions are supplied over the channel 13 to the head 15. To enable the multiplexer 15 to effect the necessary re-multiplexing of the reproduced samples, a line identifier signal is derived, for example, from address signals associated with the video data, and is supplied to the switching signal generator 23.

Figure 2:
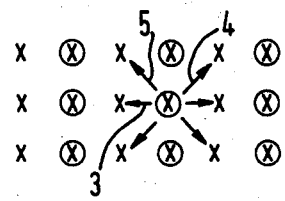
FIG. 2 shows diagrammatically a spatial array of reproduced luminance samples.
Figure 4:
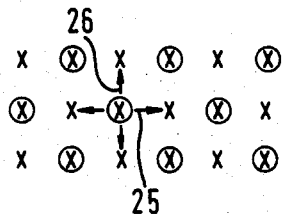
FIG. 4 shows diagrammatically another spatial array of reproduced luminance samples.

The effect of this line-by-line switching will now be described with reference to FIG. 4, which shows a spatial array of reproduced luminance samples, and which should be compared with the array shown in FIG. 2. Again, each line of crosses in the array represents reproduced luminance samples in a horizontal scan line of the television picture. Similar effects to those to be discussed for the luminance samples also occur for the color difference samples. If now it is assumed that the video samples in one of the two channels are lost or are bery seriously degraded so as to be unusable, for example because one of the heads has become clogged, then alternate luminance samples will be lost, these samples being shown ringed. However, as compared with the array shown in FIG. 2, where there was no line-by-line switching, it will be seen that each missing sample is surrounded by four available samples disposed in the horizontal and vertical directions. Thus concealment by interpolation in the horizontal direction 25 and/or the vertical direction 26 is possible in respect of each of the missing samples, and this results in improved concealment as compared with the situation described with reference to FIG. 2.

Figure 5:
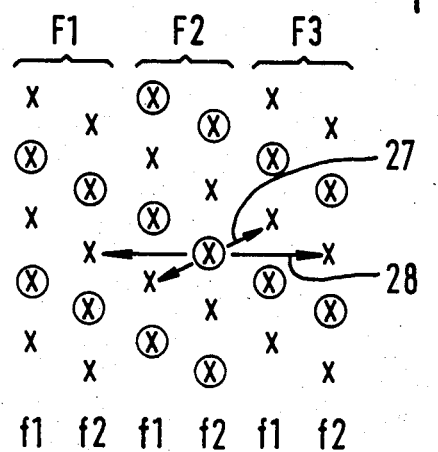
FIG. 5 shows diagrammatically a temporal array of reproduced luminance samples.

It is also desirable that the demultiplexing is alternated on a frame-by-frame basis, but where there are an odd number of horizontal scan lines in each frame, for example as in the 625-line or 525-line systems, this will occur automatically if there is line-by-line switching. FIG. 5 shows a vertical slice of reproduced luminance samples disposed at corresponding positions in horizontal scan lines of successive frames F1, F2 and F3, each comprising first and second fields f1 and f2. The reproduced samples which would be lost on failure of one out of two channels, in the case where there is frame-by-frame switching, are shown ringed. Due to the switching the lost samples are not aligned horizontally in this array, and in consequence there are at least two good methods of concealment available. These are interpolation using the two samples in the nearest corresponding positions in the adjacent horizontal scan lines in the two adjacent fields, as indicated by 27, and interpolation using the two samples in the corresponding positions in the two adjacent frames, as indicated at 28. As a variant of this latter interpolation, the concealment device 20 (FIG. 3) may include a frame store having addresses for storage of video samples for all positions in a frame. If only the video samples which are not in error are written into the frame store, then it will be seen from the array of FIG. 5 that the value stored at each address will be correctly up-dated once per alternate frame.

Figure 6A:
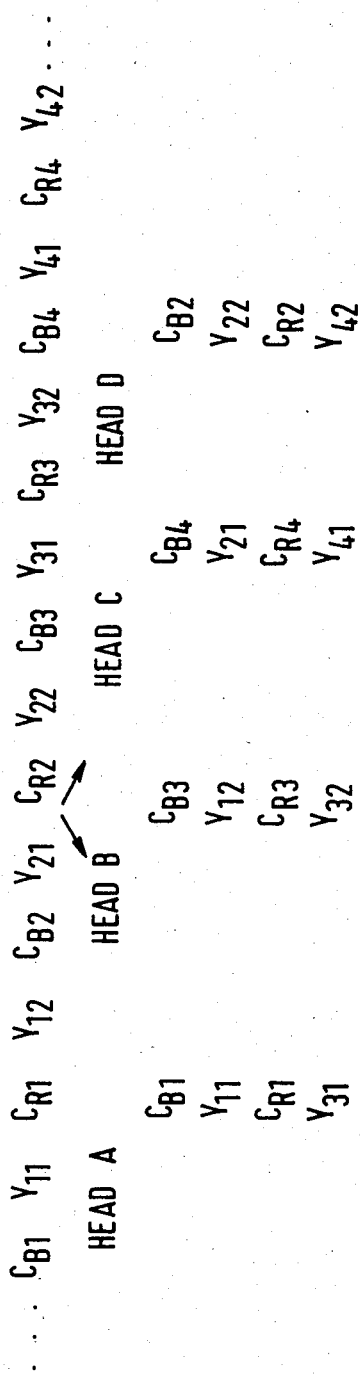
FIGS. 6A and 6B show diagrammatically the demultiplexing of a sequence of video samples.
Figure 6B:
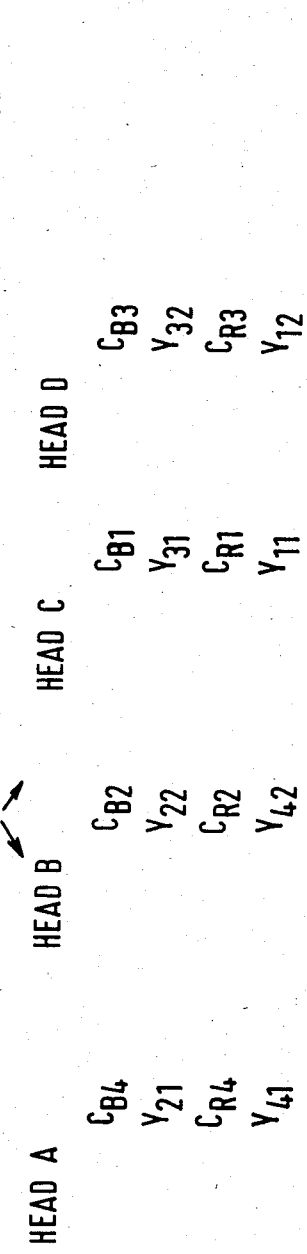

As mentioned above, the video data can be demultiplexed into an even number of channels exceeding two. FIG. 6A shows how incoming luminance and color difference samples can be demultiplexed into four channels for supply to heads A, B, C and D. In this case the line-by-line switching may operate cyclically, so that for example the video samples shown in the left-hand column in FIG. 6A are successively supplied line-by-line to the heads A, B, C and D. Preferably, however, the switching occurs line-by-line between the heads A and C, and between the heads B and D, and this results in the even lines having the demultiplexing as shown in FIG. 6A and the odd lines as shown in FIG. 6B.

Figures 7, 8, 9:
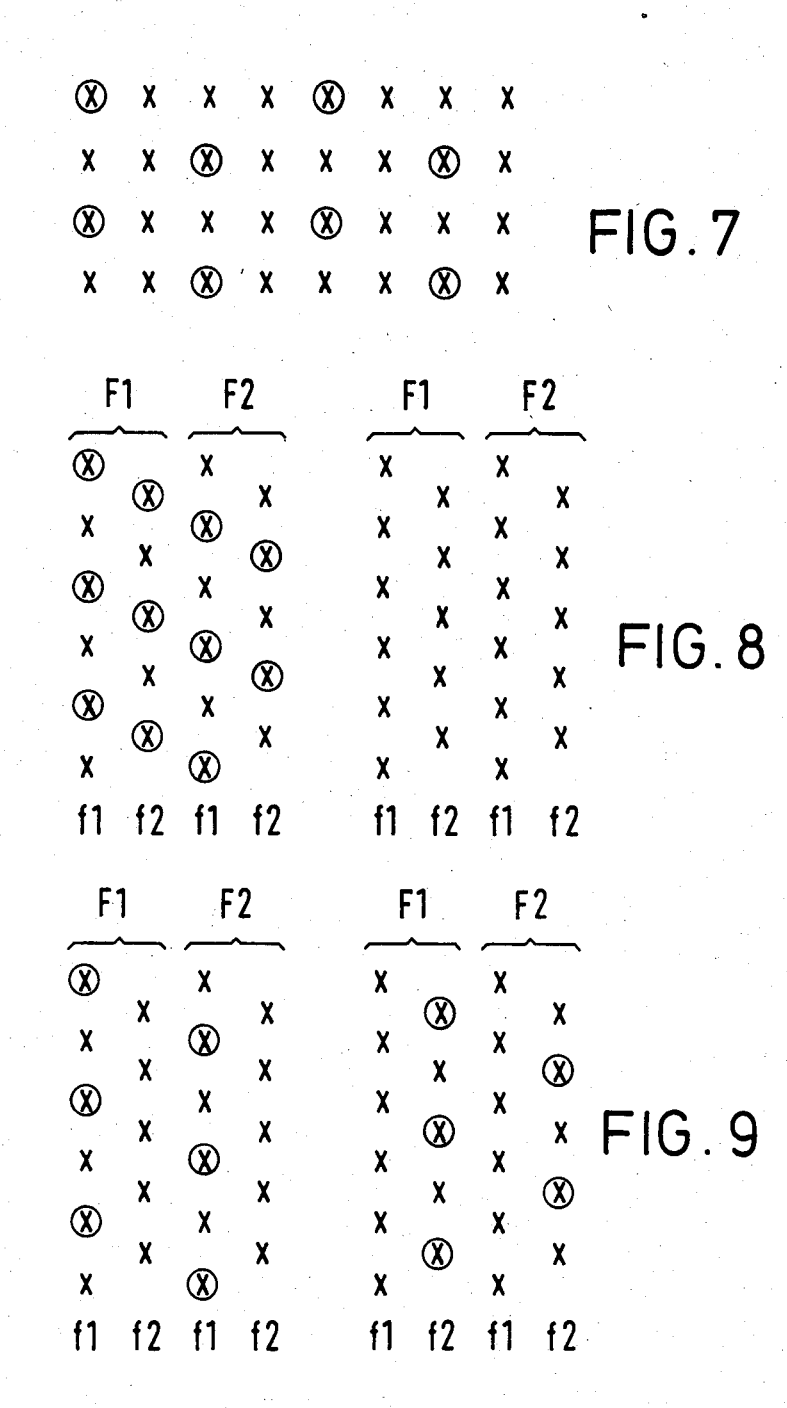

The effect of this line-by-line switching will now be described with reference to FIG. 7, which shows a spatial array of reproduced luminance samples. Again, each line of crosses in the array represents reproduced luminance samples in a horizontal scan line of the television picture. If now it is assumed that the video samples in one of the four channels are lost or are very seriously degraded so as to be unusable, then one in four luminance samples will be lost, these samples being shown ringed. In this case each missing sample is surrounded by eight available samples, so the lost samples can readily be replaced satisfactorily by interpolation.

Still better concealment may, however, be achieved by modifying the switching. Thus, consider FIG. 8, where the left-hand part of the array shows a vertical slice of reproduced luminance samples disposed at corresponding positions in horizontal scan lines of successive frames F1 and F2, each comprising first and second fields f1 and f2, the vertical slice corresponding to the first (extreme left-hand) column of samples in FIG. 7. The right-hand part of the array is similar, but shows a vertical slice corresponding to the second column of samples in FIG. 7. It will be seen from FIG. 8 that merely switching line-by-line between the heads A and C, and B and D is not very favorable where a frame store is used for temporal concealment, as all the missing samples are concentrated into alternate vertical slices.

This concentration of the missing samples can be avoided by effecting further switching field-by-field, for example between the heads A and B, and C and D. The effect of such modified switching is shown in FIG. 9, which otherwise corresponds to FIG. 8. In this case there is in every vertical slice of reproduced luminance samples, a complete set of correct samples in every alternate field, so that in a frame store the value stored at each address can be correctly up-dated once per frame.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Digital video tape recorder apparatus comprising:
 a recording head assembly having 2n heads, where n is an integer;
 a demultiplexer responsive to an incoming digital video signal organized in a plurality of video lines, each line being formed of a plurality of video samples, for demultiplexing said video signal sample by sample into 2n channels for supply to said 2n recording heads; and
 switching means for switching the connections between said channels and said heads line-by-line of said television signal, so that said connections are different from one line to the next.

2. Apparatus according to claim 1 wherein said video signal is further organized in a plurality of video fields, each field being formed of a plurality of video lines, and said switching means additionally switches the connections between said channels and said heads field-by-field of said television signal.

3. Apparatus according to claim 1 wherein said video signal is further organized in a plurality of video frames, each frame being formed of a plurality of video lines, and said switching means additionally switches the connections between said channels and said heads frame-by-frame of said television signal.

4. Apparatus according to claim 1 wherein n is one.

5. Apparatus according to claim 1 wherein n is two.

6. Apparatus according to claim 1 comprising a multiplexer for multiplexing said video samples subsequent to reproduction in a manner inverse with respect to the demultiplexing effected by said demultiplexer, thereby forming a reproduced digital television signal corresponding to said incoming digital signal.

7. Apparatus according to claim 6 further comprising a concealment means to which said reproduced digital television signal is supplied and which operates to replace error samples in said reproduced digital television by interpolation.

8. Apparatus according to claim 7 wherein said concealment means includes a frame store.

9. Apparatus according to claim 1 wherein n is three.

* * * * *